Sept. 16, 1947. R. F. MOZLEY ET AL 2,427,366
PHASE CONTROL APPARATUS
Filed Sept. 8, 1944 2 Sheets-Sheet 1

INVENTORS:
ROBERT F. MOZLEY
DANIEL S. PENSYL, DECEASED,
BY MARY P. PENSYL, EXECUTRIX
BY Paul S. Hunter
ATTORNEY

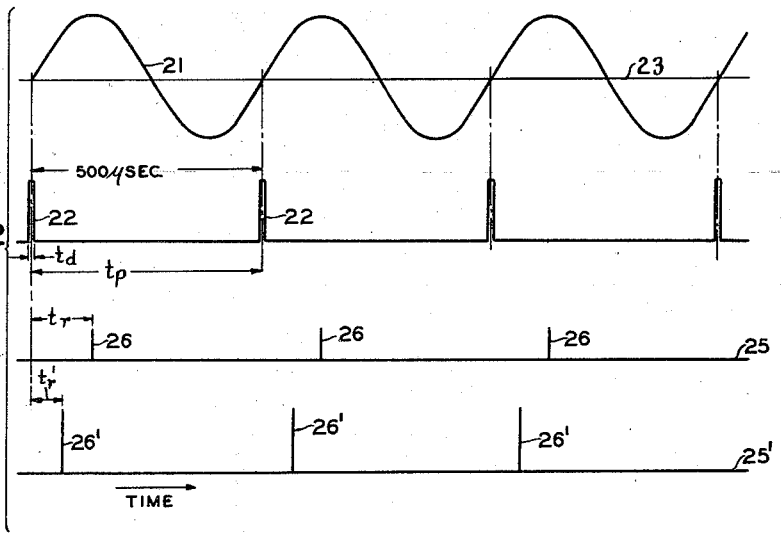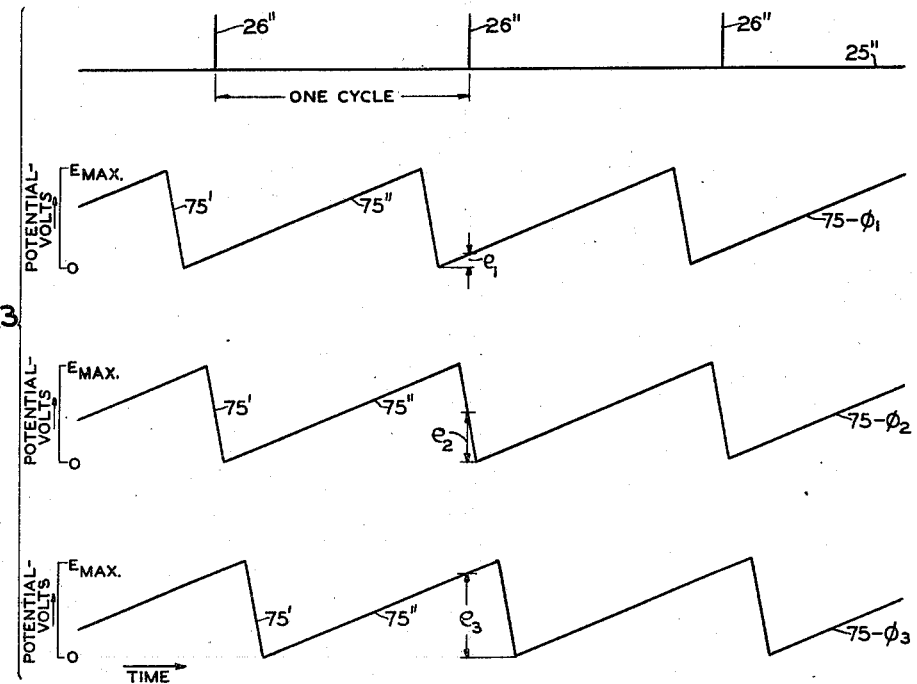

Patented Sept. 16, 1947

2,427,366

UNITED STATES PATENT OFFICE 2,427,366

PHASE CONTROL APPARATUS

Robert F. Mozley, Hempstead, N. Y., and Daniel S. Pensyl, deceased, late of Garden City, N. Y., by Mary P. Pensyl, executrix, Garden City, N. Y., assignors to Sperry Gyroscope Company, Inc., a corporation of New York Application September 8, 1944, Serial No. 553,201

12 Claims. (Cl. 172—245)

The present invention relates to systems for automatically maintaining a desired phase relation between two alternating signals of harmonically related frequencies.

In a preferred embodiment, the present invention relates more particularly to systems for maintaining a desired phase relation between a periodic series of recurrent pulses and a sinusoidal, triangular or saw-tooth wave form of an electric wave generating device.

In electrical communication and signalling systems it is often desirable to advance or delay the phase of the output wave of one electrical device for maintaining a substantially fixed phase relation with a reference voltage wave. For example, in radio object detection systems of the type employing an ultra high frequency pulse transmitter adapted to project high intensity, extremely brief pulses of ultra high frequency energy toward a distant object or target, and a receiver adapted to receive relatively weak pulses of ultra high frequency energy reflected back from the distant object, it is often desirable to provide apparatus for synchronizing a signal generator or related device with the detected and amplified pulse output of the receiver.

In such radio object detection systems, an appreciable time elapses between the instant at which the pulse is transmitted and the instant at which the reflected pulse is received. This is the time required for propagation of the radio energy from the transmitter to the object and propagation of reflected energy from the object to the receiver. Since the propagation speed in each direction is approximately 186,000 miles per second, the speed of light, this elapsed time between the instant of pulse transmission and the instant of reflected pulse reception is of the order of 11 microseconds per mile of distance between the radio object detection system and the detected object. The elapsed time or phase delay between the transmission and reception of the recurrent pulses in such a system is relied upon as the measure of the distance or range of the detected object.

If the object or target detected by such a system remained at a fixed distance from the radio transmitting and receiving system, a fixed time delay would result between the instants of pulse transmission and the respective instants of reflected pulse reception. Thus, with periodically recurrent pulses transmitted toward and reflected from the object, as for example, pulses of one microsecond duration transmitted at a uniform rate of two thousand pulses per second, a fixed phase relation would exist between the transmitted pulses and received pulses. Accordingly, an alternating current wave generator could be adjusted for synchronization in any desired phase relation with the received pulses by the use of a synchronizing link and a manually adjustable phase shifter coupling the aforementioned alternating current wave generator to the transmitter pulse generator.

In practice, however, radio object detection systems are usually employed under conditions involving relative movement between the detection system and the detected object. It is often desirable, therefore, to provide apparatus adapted to operate from the received, detected and amplified pulses, to synchronize automatically an alternating current wave generator or related device in a particular phase relation with the received pulses.

In some radio object detection systems, an alternating voltage is synchronized with a reference voltage, e. g., the pulse frequency control source of a pulse radio object detection transmitter, through a voltage-controlled phase shifting apparatus. A phase comparator is provided responsive to the above-mentioned alternating voltage and also to a recurrent pulse wave, e. g., the pulses received and detected by a radio object detection receiver associated with the above-mentioned transmitter for producing an output signal varying sharply as the relative phase shift from a predetermined phase relation between said received pulses and said alternating voltage. This phase comparator output voltage is applied to the control circuit of the above-mentioned voltage-controlled phase shifting apparatus for varying the phase shift thereof in such a way as to suppress or minimize the above-mentioned relative phase shift from a normal phase relation between the alternating voltage and the recurrent pulse wave. Such a sysem, generally, is disclosed in U. S. patent application Serial No. 434,403, filed March 9, 1942 in the name of Horace M. Stearns.

A major object of the present invention is to provide improved apparatus for comparing the phase relation between two harmonically related signals.

Another major object of the invention is to provide improved apparatus for automatically maintaining a desired phase relation between two harmonically related signals.

Another object of the invention is to provide improved apparatus for comparing the phase relation between a reference signal and a series of periodically recurring pulses by synchronizing a saw-tooth voltage wave with the reference signal and measuring the average of the magnitudes of the saw-tooth voltage at the instants of the successive recurrent pulses.

A further object of the invention is to provide improved apparatus for automatically maintaining a desired phase relation between a reference signal and a wave form of periodically recurring pulses in which a saw-tooth voltage is synchronized with the reference signal and the magnitude of the saw-tooth voltage at the instant of each pulse is utilized to change the phase of the saw-tooth wave to maintain a condition of relative phase equilibrium between the recurrent pulses and the saw-tooth wave form alternating voltage.

A further object of the invention is to provide improved apparatus for synchronizing the output wave of a saw-tooth wave generator with a wave form of periodically recurring pulses.

A still further object of the invention is to provide an improved method of range measuring for an object detection system including generating a saw-tooth wave synchronized with the transmission of each energy pulse and adjusting the phase of said saw-tooth wave relative to said transmitted pulses to suppress variations of the voltage of said saw-tooth wave at the successive instants of received pulses.

Further objects will become apparent from a study of the following description taken in conjunction with the drawings, wherein:

Fig. 2 is a wave form plot illustrating the phase relations among an alternating voltage source, the pulses synchronized with said source for controlling the output of an ultra high frequency transmitter, the relatively weak pulses received from a distant object, and the stronger pulses reflected from a near-by object;

Fig. 3 is a further wave form diagram showing various phase relations between a series of periodically recurrent pulses and a saw-tooth wave harmonic with said recurrent pulses.

Figure 1:
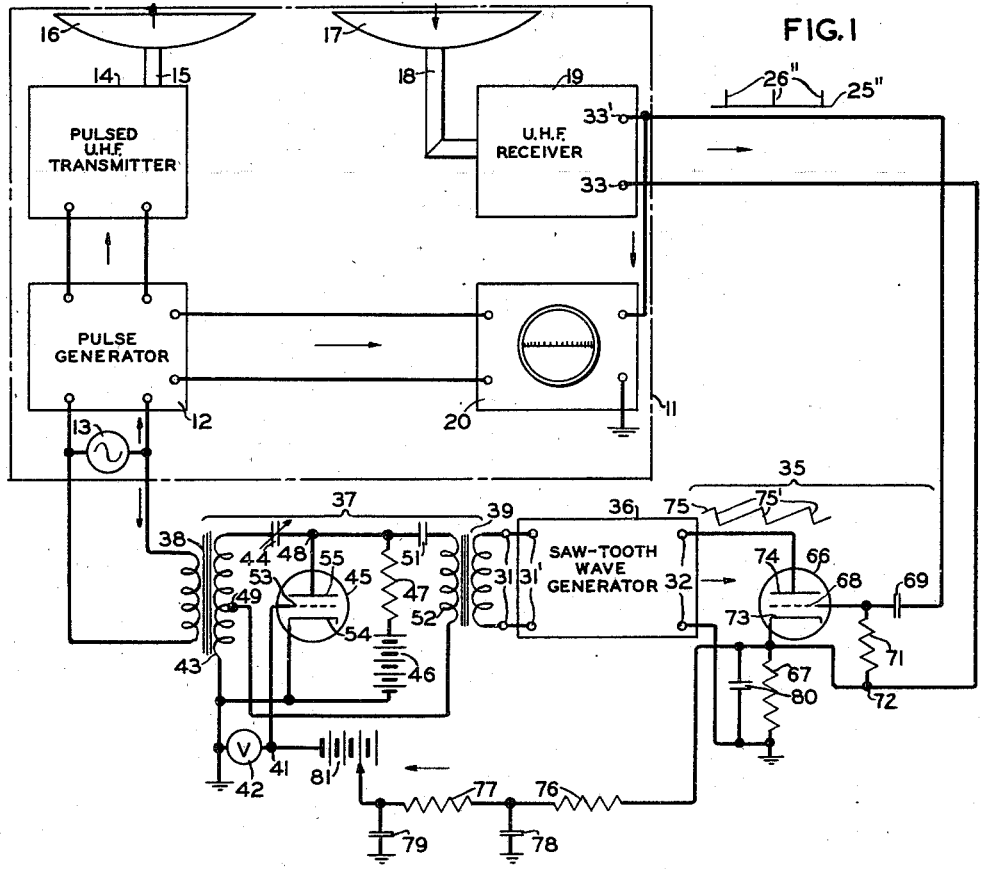
Fig. 1 is a circuit diagram of the present invention, shown applied to a pulsed radio object detection system.

According to the present invention, an alternating voltage is produced by a generator synchronized with a reference voltage through a variable phase shifting device. A very simple phase comparator is made operative during a relatively brief instant in each cycle of the alternating voltage output of the generator through a controlling action exerted thereon by recurrent voltage pulses, which may be provided by an object detection receiver output circuit. Preferably, a vacuum tube is employed as the phase comparator, with the above-mentioned alternating voltage applied to the anode-cathode circuit of the tube, and the grid circuit controlled by the receiver output pulses of the pulse detection system. This phase comparator tube then produces an output voltage proportional to the momentary intensity of said alternating voltage at the successive instants of the recurrent grid voltage pulses supplied by the object detection receiver. A grid-leak, grid-capacitor combination may be employed in the grid circuit of the phase comparator tube to insure that the tube is so biased as to prevent anode current flow during the intervals between successive grid voltage pulses.

In order to cause the output voltage of the phase comparator to vary throughout the full range thereof while limiting the relative phase variation between the two voltages applied thereto—the recurrent pulse grid voltage and the alternating anode-cathode voltage—to a very small range, e. g., to a phase angle range of the order of two degrees, the wave form of the alternating voltage applied to the anode-cathode circuit of the phase comparator may be a saw-tooth wave form, produced in a well known manner. The voltage-responsive phase shifting apparatus controlled by the phase comparator output voltage may be so adjusted as to operate to synchronize the extremely steep portion of each successive saw-tooth wave cycle with a received pulse applied to the grid of the phase comparator.

Since each cycle of a well-formed saw-tooth wave alternating voltage includes a gradual slope extending almost throughout the cycle, e. g., through 358 degrees of the cycle, and a very steep return portion during the remainder of the cycle, e. g., two degrees, the choice of the steep portions of the saw-tooth alternating voltage wave as the portions to be synchronized with the comparator grid pulses insures operation of the phase comparator throughout its maximum output voltage range with minimum relative phase shift between the two signal voltages applied thereto. Thus, the phase shift provided in the variable phase shifting apparatus may be controlled in accordance with the above relatively steep output voltage changes of the phase comparator to retain the saw-tooth wave alternating signal in substantially fixed phasal relation with the pulses applied to the phase comparator grid.

By virtue of this highly desirable condition of close regulation of the relative phase displacement between the recurrent pulse wave applied to the grid circuit of the phase comparator and the saw-tooth alternating voltage applied to the anode circuit of the comparator, a very large relative phase change of the recurrent pulse wave with respect to the reference source voltage wave is accompanied by a very nearly equal shift of the saw-tooth alternating voltage, produced through the action of the phase comparator output voltage on the phase shifting apparatus. For example, a change in phase of 90° of the recurrent pulse wave with respect to the reference voltage may result in a change of 89½° in the same sense of the saw-tooth alternating voltage with respect to the reference source, the ½° relative change of phase between the pulses and the saw-tooth wave being sufficient to produce a large change of phase comparator output voltage as required to produce the 89½° phase shift in the output of the electrically operated phase shifter. The net effective phase shift between the adjustable phase saw-tooth wave and the variable phase recurrent pulse wave in this example, therefore, is limited to a fraction of a degree during a very wide change of phase with respect to the synchronizing reference voltage.

Referring now to Fig. 1, a radio object detection system 11 is shown connected to the automatic phase control apparatus of the present invention. The radio object detection system 11 comprises a pulse generator 12 synchronized with an alternating voltage generator 13, and employed to supply very brief, high amplitude pulses of energy to an ultra high frequency transmitter 14. The pulses generated by pulse generator 12 may be of the order of one microsecond duration, for example, and may be generated at any desired repetition rate, e. g., two thousand pulses per second, corresponding to a fundamental frequency of 2,000 cycles per second. The ultra high frequency transmitter 14 is thus energized during pulses of the order of one microsecond duration and may generate ultra high frequency output, for example, at a frequency of 10,000 megacycles per second, during each successive output pulse initiated by pulse generator 12. The pulses of ultra high frequency output energy produced by transmitter 14 are conducted through a wave guide or coaxial transmission line 15 to a highly directive antenna 16, which may be directed toward a distant object for irradiating the object and causing it to reflect some ultra high frequency energy back to the pulse detection system.

A further highly directive antenna 17 may be provided for intercepting a portion of the ultra high frequency energy reflected from the distant object. The energy intercepted by receiving antenna 17 may be conducted through an ultra high frequency transmission line or wave guide 18, to ultra high frequency receiver 19, which may be of the superheterodyne type, for example. This receiver 19 is adapted to detect and amplify the pulses of ultra high frequency energy reflected from a distant object and to supply the detected and amplified output pulses to a phase indicator 20 coupled to the pulse generator 12, so that these pulses may be compared in strength and phase relation with the pulses transmitted by transmitter 14, in order to provide information as to the relative size and distance of a detected object.

In Fig. 2 is shown a series of wave form diagrams which aid in understanding the operation of the radio object detection system 11. An alternating voltage wave which, for example, may be a sinusoidal wave of two thousand cycles per second, is represented at 21. This wave 21 corresponds with the output voltage wave of the timing reference generator 13. The pulse generator 12 may be synchronized with generator 13 for producing a high amplitude pulse 22 at a predetermined point in each cycle of the voltage wave 21, e. g., at the time corresponding to the positively increasing potential of wave 21 as the wave passes through the zero voltage axis 23. With pulses 22 of the order of one microsecond duration, $t_d$, and with the interval $t_p$ between successive pulses 22 of the order of 500 microseconds, for example, the pulsed ultra high frequency transmitter 14 is enabled to produce a very high intensity train of ultra high frequency oscillations during each successive pulse 22.

A wave form illustrative of the output signal produced by the ultra high frequency receiver 19 is shown at 25. This wave form illustrates a relatively weak pulse produced in the output circuit of receiver 19 after an interval $t_r$ of approximately one-quarter of the period $t_p$ after each transmitted pulse 22. This interval $t_r$ between the time of a transmitted pulse 22 and a received pulse 26, if of the order of 125 microseconds, would correspond with a distance of the order of 11 miles between the radio object detection system 11 and the detected object.

As stated before, in most applications of radio object detection systems, appreciable relative movement exists between the radio object detection system and the object or target detected thereby. In many instances, a stationary object detection system is employed for detecting the position and movement of aircraft, ships, submarines and similar vehicles. In other instances, radio object detection systems are installed in aircraft or ships for obtaining information concerning the whereabouts of stationary or movable objects. Thus, in most radio object detection system applications, the signal strength of the received pulses varies appreciably, as does the time interval between the instant of pulse transmission and the instant of reception of a relatively weak reflected pulse, as the distance varies between the object detection system and the detected object.

In order to illustrate in Fig. 2 the variation of strength and phase of a received output wave as a detected object moves closer to the object detection system, a further receiver output wave form 25' is included for comparison with the output wave 25. The received wave 25' represents a detected object at a distance of the order of 5 miles from the detection system 11, according to the above example of 500 microsecond pulse intervals $t_p$. Thus, in the comparison of waves 25 and 25', Fig. 2 illustrates the decreasing phase delay $t_r'$ and increasing strength of the received, detected wave as a detected object approaches the ultra high frequency object detection system.

In radio object detection systems of the type described above, it may be desirable to synchronize an alternating voltage wave, such as that appearing at a pair of terminals 31 in Fig. 1, or a saw-tooth voltage wave of the type appearing at a pair of terminals 32, with the recurrent output pulses provided by receiver 19 at terminals 33, 33' and to maintain a desired phase relation between the alternating voltage wave at either pair of terminals 31 or 32 with the recurrent received pulses. For this purpose, a saw-tooth wave generator 36 is synchronized with the pulse generator 12 and timing reference generator 13 through a variable phase shift device 37. An instantaneous amplitude responsive phase comparator device 35 coupled to the receiver output terminals 33, 33' is provided for cooperation with the saw-tooth wave generator 36 to produce an output voltage varying as the instantaneous output voltage of generator 36 during the successive output voltage pulses 26'' from receiver 19. The output voltage of this device 35 is applied to the phase shift control voltage terminal 41 of the variable phase shifter 37, for automatically varying the output phase at output terminals 31 of the phase shifting device 37 and synchronizing voltage terminals 31' of the saw-tooth generator 36 and accordingly for varying the phase of the saw-tooth output wave of generator 36 provided at terminals 32 in accordance with phase variations of the output pulses produced by receiver 19 across the output terminals 33, 33'.

The saw-tooth wave generator 36 may take any of several well known forms, ordinarily comprising a relaxation oscillator provided with a capacitance-resistance discharge circuit and often including one or more amplifier stages. The saw-tooth generator 36 includes synchronizing input terminals 31' for controlling the phase and frequency of the saw-tooth wave produced at the output terminals 32 in accordance with the frequency and phase of an alternating voltage signal applied to terminals 31'.

The variable phase shift device 37 is provided with an input transformer 38 coupled to the timing reference alternating voltage source 13, and an output transformer 39 for applying a synchronizing control voltage to the synchronizing terminals 31' of the saw tooth generator 36. The variable phase control device 37, which may take any of a large variety of forms, preferably is suited to vary the phase of the output signal produced in transformer 39 smoothly over a wide range in accordance with a controlling voltage applied at the phase control voltage input terminal 41, and shown indicated by a voltmeter 42.

In the version of the voltage responsive variable phase shifting device 37 shown in Fig. 1, the transformer 38 is provided with a center tapped secondary winding 43 applying the full secondary voltage across the series combination of an adjustable capacitor 44 and the anode-cathode circuit of a vacuum tube 45. The vacuum tube 45, provided with a continuous source of positive anode voltage 46 through an impedance 47, serves as a variable resistance for cooperation with the capacitor 44 in a well known manner to vary the phase of the voltage developed at junction 48 between vacuum tube 45 and capacitor 44, with respect to the center-tap terminal 49 of transformer secondary winding 43.

The variable phase output voltage developed between junction 48 and terminal 49 is applied through a direct current blocking capacitor 51 to the very high-impedance primary winding 52 of the electrical phase adjuster output transformer 39.

With the above arrangement of elements, the effective resistance provided by vacuum tube 45 between cathode and anode is varied in accordance with the variation of the voltage applied to the control grid 53 of vacuum tube 45 with respect to the grounded cathode 54 thereof. This control grid voltage may be varied over a range from anode-current cut-off bias for vacuum tube 45, representing the maximum anode-cathode resistance, to a slightly positive grid voltage value producing an extremely low effective resistance in the path from the anode 55 to the cathode 54. When the potential of control grid 53 is made equal to the potential of the cathode 54, and the resistance of the tube is thus extremely low, the output phase is relatively advanced. When the potential of grid 53 is at an appreciable negative level with respect to cathode 54, the anode-cathode resistance of vacuum tube 45 is very high, and the output phase is retarded.

Since the phase shift of the output voltage from phase shifter unit 37 is determined by the potential of the control voltage terminal 41, a voltmeter 42 may be provided for measuring this voltage and thus for indicating the phase shift of the voltage across terminals 31 and the voltage across terminals 32 with respect to the reference source 13. Furthermore, since the system of the present invention serves to retain a substantially fixed phase relation between the saw-tooth voltage output wave 75 and the recurrent pulse receiver output wave, the indication of the voltmeter 42 may be taken as a measure of range of an energy-reflecting object detected by a radio object detection system.

By virtue of the continuous anode polarizing supply 46, the anode 55 is maintained positive with respect to the cathode 54 throughout each cycle of the alternating voltage provided by the secondary winding 43 of the transformer 38, so that no rectifying action results in the variable resistance tube 45.

The saw-tooth output voltage wave produced by generator 36 between output terminals 32 is applied to the anode-cathode circuit of an electron discharge device 66, through a cathode load resistor 67 shunted by a cathode by-pass capacitor 80. The control grid 68 of the discharge device 66 is coupled through a capacitor 69 to the high potential output terminal 33' of receiver 19. Control grid 68 is also connected to grid leak resistor 71, which in turn is connected at the opposite end 72 to the cathode 73 of the electron discharge device 66, and to the other output terminal 33 of receiver 19.

During the reception of pulses of ultra high frequency energy reflected from a distant object, a series of high intensity pulses 26'' is applied to the grid circuit of the electron discharge device 66, including the capacitor 69 and the resistor 71. By virtue of grid current conduction through the device 66, a direct-current grid potential nearly equal to the peak intensity of pulses 26'' is developed across grid capacitor 69, in a well known manner corresponding to the grid leak and grid capacitor action employed in radio receivers. Accordingly, the control grid 68 is maintained at a very large negative potential with respect to the cathode 73 during the intervals between successive pulses 26''.

During the very brief output pulses 26'', however, the control grid 68 is caused to assume a potential slightly positive with respect to the cathode 73. During these very brief intervals, the electron discharge device 66 is rendered in condition for low-resistance current conduction between anode 74 and the cathode 73. Thus, a very brief current pulse is permitted to flow through the series circuit comprising device 66 and the output resistor 67, under the influence of the output voltage momentarily existing between the output terminals 32 of the saw-tooth wave generator 36.

Thus, it is seen that the brief pulses of current permitted to flow through the device 66 and load resistor 67 during the instants when pulses 26'' are produced in the output circuit of receiver 19, are of amplitude dependent on the voltage of the saw-tooth output wave 75 at those instants. Since the pulses 26'' are of substantially constant duration, e. g., of one microsecond, the time-average of the current produced through resistor 67 by the simultaneous action of the saw-tooth generator 36 and the grid voltage pulses 26'' varies substantially in proportion to the height of the saw-tooth voltage wave 75 at the instants of the received pulses 26''.

A resistance-capacitance filter comprising resistors 76 and 77 and capacitors 78 and 79 is connected to the junction between load resistor 67 and the cathode 73 of the vacuum tube 66, to provide across output capacitor 79 a unidirectional voltage representing the average amplitude of the instantaneous voltages developed across resistor 67 and shunt capacitor 80. This voltage developed across capacitor 79 is a positive voltage with respect to ground, and is applied in series opposition with an adjustable direct biasing voltage provided by bias battery 81 through phase shifter control terminal 41, to the grid 53 of the phase control tube 45.

According to an important feature of the present invention, the phase comparator device 35 is so arranged with respect to the phase shifting device 37 as to vary the phase shift in the device 37 as required to produce synchronization of the relatively steep portions 75' of the wave 75 with the receiver output pulses 26''.

Referring now to Fig. 3, wherein is shown an enlarged plot of the receiver output wave 25'' extending along a common time axis with three saw-tooth wave form portions $75-\phi_1$, $75-\phi_2$, and $75-\phi_3$, the operation of the phase comparator 35 may be readily understood from a study of the height $e_1$, $e_2$ or $e_3$ of any of the three saw-tooth waves coincident with the recurrent receiver output pulses 26". As shown in Fig. 3, the waves $75-\phi_1$, $75-\phi_2$ and $75-\phi_3$ are characterized by a relatively gradual voltage increase from zero to a maximum positive value, followed by a very rapid decrease from the maximum value to zero. To aid in understanding Fig. 3, the portion 75' of each cycle required for the voltage decrease from the maximum positive value to zero has been shown as substantially 1/18 cycle, or 20°, whereas in practice the voltage decrease may be far steeper, requiring only one or two degrees of each cycle.

As stated above, the phase comparator 35 and the phase shifter 37 cooperate to produce coincidence of the steep portions 75' of the saw-tooth waves 75 with the received pulses 26". This condition is illustrated clearly by the wave $75-\phi_2$ of Fig. 3, while the saw-tooth wave $75-\phi_3$ is retarded by approximately 45° with respect to the desired coincidence condition, and the wave $75-\phi_1$ is correspondingly advanced. With the normal desired condition illustrated by the wave $75-\phi_2$, the voltage $e_2$ applied to the anode 74 of phase comparator device 66 at the instant of a received pulse 26" is $$\frac{E_{max}}{2}$$

With an average time-phase relation between the receiver output pulse wave 25" and the reference frequency source 13, the potential inserted in the grid circuit of the phase-shifter tube 45 by the source 81 is adjusted so that the desired phase relation of the wave $75-\phi_2$ and the received wave 25" is obtained.

If the phase delay of the received wave 25" increases with respect to the output voltage of reference source 13, the saw-tooth wave 75 will tend to lead the pulse wave 25". This results in a very steep decrease of the anode potential of phase comparator device 66 during pulses 26", so that the positive output potential at the output of the filter 76, 77, 78, 79 is greatly decreased. The negative grid bias of the phase shifter tube 45 is therefore materially increased, and accordingly the phase delay through phase shifter 37 is greatly increased, to an extent very nearly equal to the increase of phase delay of the received pulse wave 25". Thus, the saw-tooth wave is retained in substantially fixed phase relation with the recurrent pulses 25".

If the phase delay of the received wave 25" decreases, on the other hand, e. g., accompanying the approach of a detected object or target toward the object detection system 11, the output voltage of the phase comparator 35 rises rapidly, so that the phase delay of the output voltage from phase shifter 37, and accordingly, the phase delay of the saw-tooth output wave from generator 36, is correspondingly decreased.

The combination of the phase comparator 35, the phase shifter 37 and the saw-tooth generator 36 is not only capable of maintaining a desired phase relation of an output wave 75 with a variable-phase wave 25", but also this arrangement is capable of "pulling in" the phase of the wave 75 to a desired relation with wave 25" from a relatively great initial error. In Fig. 3, the wave $75-\phi_1$, shown advanced approximately 45° ahead of the desired condition, represents a very small anode voltage $e_1$ applied to the phase comparator device 66 during the pulses 26". A very small positive output voltage is then supplied by the phase comparator 35 in series opposition to the voltage of bias source 81, and therefore a large increase of phase delay is readily provided in phase shifter 37. By virtue of this large increase of phase delay in the phase shifter 37, the saw-tooth output wave is very quickly adjusted to the desired phase relation shown by the wave $75-\phi_2$.

On the other hand, a momentary phase delay of the wave 75 by 45° from the normal relation with respect to the wave 25", as shown by wave portion $75-\phi_3$ of Fig. 3, is accompanied by a very large anode voltage $e_3$ of the phase comparator device 66 during successive control grid pulses and thus the output potential of phase comparator 35 through the filter 76, 77, 78, 79 is adequate to overcome the bias from source 81, decreasing the resistance of the phase shifter tube 45 as required to advance the output phase of the phase shifter 37 sufficiently to restore the desired condition shown by wave $75-\phi_2$.

Figure 4:
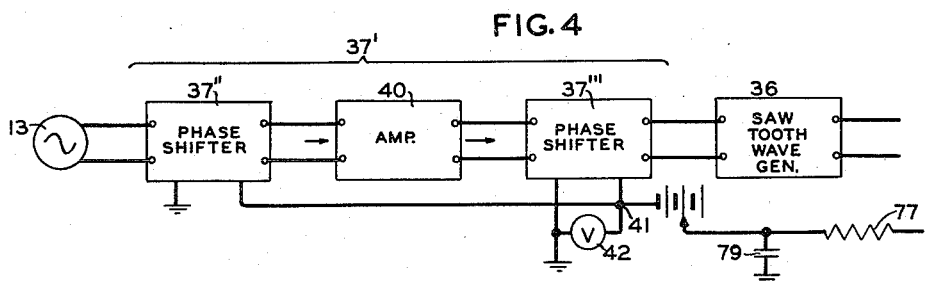
Fig. 4 is a diagram showing the use of two cascade phase shifter units for greater overall phase shift range than is provided by the single phase shifter unit of Fig. 1.

The phase shifter 37 is limited to a range of electrically controlled output phase variation somewhat smaller than one-half cycle or 180°. If a greater range of phase shift variation is desired, the one-tube phase shifter 37 of Fig. 1 may be replaced by a system 37' embodying two or more cascade phase shifter stages. As illustrated in Fig. 4, a first phase shifter unit 37", generally similar to the phase shifter unit 37 of Fig. 1, is connected to the reference source 13 to receive an input signal therefrom. The phase-shifted output of the unit 37" is coupled to the input circuit of a further phase shifter unit 37"', either directly or through an amplifier 40. The output of the second phase shifter 37"' may be connected to the synchronizing signal terminals of the saw-tooth generator 36. The grid control circuits of the cascade phase shifter are connected in parallel, and are connected to a junction point 41 to which the control voltage is supplied as described above.

With two phase shifter units 37" and 37"' included in cascade relation in the phase shifting network 37', the maximum phase shift range of the system may be made to approach 2×180° or 360°. If a phase shift range greater than 360° is desirable, further cascade phase shifter units similarly may be added in cascade relation.

From the foregoing discussion of the operating relations of the phase comparator 35, the phase shifter 37 or 37', and the saw-tooth generator 36, it is clearly apparent that the phase comparator 35 receives two alternating output voltages of harmonically related frequencies but of variable relative phase, one voltage, preferably a saw-tooth wave, being applied to the anode circuit and the other, preferably a recurrent pulse wave, being applied to a grid circuit of the comparator 35. The comparator 35 produces an output voltage varying very abruptly with a very small variation of the relative phase of the two alternating voltages. This comparator output voltage controls the phase shift in an electrically variable phase-shifter device arranged to control the relative phase of one of the above alternating voltages with respect to the output wave of a reference source 13 which is fixedly related in frequency with the other of the alternating voltages applied to the phase comparator 35. In this manner, the apparatus of the present invention provides very close-tolerance control of the relative phases of the two alternating voltages applied to the phase shifter 35.

Although this apparatus is particularly useful where one of the alternating voltages applied to the phase comparator 35 has recurrent pulse wave form and the other alternating voltage has a saw-tooth wave form, as described, for highly accurate phase control, other wave forms may be maintained in a desired phase relationship. In the embodiment of the invention shown in Fig. 1, for example, the output wave form of transformer 39 which may be substantially sinusoidal is maintained in substantially fixed phase relationship with the pulse wave 25''. A triangular wave or saw-tooth wave alternating voltage may be substituted for the recurrent pulse wave 25'', if desired, this substituted wave then serving to trigger the phase comparator 35 so that the substituted wave form is effective on the phase comparator 35 to maintain a fixed phase relation of this wave with the input alternating voltage of the generator 36.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Phase sensitive apparatus for comparing the phase relation between recurrent pulses and a harmonically related reference signal, comprising a saw-tooth voltage generator synchronized with said reference signal, and a series circuit including the electron discharge path of a grid-controlled electron discharge device and an impedance connected to said generator, the grid potential of said electron discharge device being controlled by said pulses whereby the average voltage across said impedance depends upon the voltage from said generator at the successive instants of said pulses.

2. Phase sensitive apparatus for comparing the phase relation between recurrent pulses and a harmonically related reference signal, comprising a saw-tooth voltage generator synchronized with said reference signal, circuit means connected to said generator and responsive to said pulses for providing a measure of said voltage at the successive instants of said pulses, and phase-shifting means controlled by the voltage of said circuit means for adjusting the phase relation between said pulses and said voltage.

3. Phase sensitive apparatus for comparing the phase relation between recurrent pulses and a harmonically related reference signal, comprising a saw-tooth voltage generator synchronized with said reference signal, circuit means connected to said generator and responsive to said pulses for providing a measure of said voltage at the successive instants of said pulses, and phase-shifting means controlled by the voltage of said circuit means for varying the phase of said saw-tooth voltage with respect to said reference signal in accordance with phase variations of said recurrent pulse wave with respect to said reference signal.

4. Phase sensitivity apparatus for maintaining a desired phase relation between a generated alternating voltage and recurrent pulses harmonically related with a reference signal, comprising a saw-tooth voltage generator synchronized with said reference signal, a series circuit including the space path of an electron discharge device and an impedance connected to said generator, the grid of said electron discharge device being controlled by said recurrent pulses to permit current flow from said generator through said electron discharge device and said impedance during said pulses whereby the average voltage across said impedance depends upon the voltage from said generator at the successive instants of said pulses, and means controlled by the voltage across said impedance for varying the phase relation between said saw-tooth voltage and said reference signal to maintain a substantially constant phase relation between said saw-tooth voltage and said recurrent pulses.

5. Phase sensitive apparatus for maintaining a desired phase relation between a saw-tooth wave alternating voltage and recurrent pulses harmonically related with a reference signal, comprising a saw-tooth voltage generator synchronized with said reference signal, circuit means connected to said generator and responsive to said pulses for providing a measure of the output voltage from said generator at the instant of said pulses, an electrically controlled device connected to said generator for shifting the output phase thereof with respect to said reference voltage, and means connecting said device to said circuit means for varying the phase shift of said device to maintain a desired phase relation between said pulses and said saw-tooth voltage.

6. Phase sensitive apparatus for comparing the phase relation between recurrent pulses and a harmonically related reference signal, comprising a saw-tooth voltage generator synchronized with said reference signal, a series circuit including the electron discharge path of a grid-controlled electron discharge device and an impedance connected to said generator, the grid of said electron discharge device being controlled by said pulses whereby the average voltage across said impedance depends upon the voltage from said generator at the successive instants of said pulses, an electron discharge device arranged in a circuit for controlling the phase of said saw-tooth voltage with respect to said reference signal, and means for controlling the resistance of said device according to the voltage across said impedance for adjusting the phase relation between said pulses and said saw-tooth voltage.

7. Apparatus for synchronizing a saw-tooth voltage wave with a recurrent pulse wave, comprising a saw-tooth wave generator, a voltage-responsive variable phase shifting device having an input circuit adapted to be coupled to an alternating current reference source and an output circuit coupled to said saw-tooth generator for controlling the phase of the saw-tooth output wave of said generator with respect to said reference source in accordance with a variable control voltage, and phase comparator means coupled to said saw-tooth generator to receive said saw-tooth wave and also adapted to receive a recurrent pulse wave for producing an output voltage varying as the relative phase of said saw-tooth wave and said recurrent pulse wave, said phase comparator output voltage being coupled to said variable phase shifting device to control the phase shift thereof.

8. Apparatus for synchronizing a saw-tooth voltage wave with a recurrent pulse wave, comprising saw-tooth wave generator means for producing an alternating output voltage wave having each successive cycle thereof characterized by a gradual voltage change from a first extreme to a second voltage extreme followed by a relatively rapid reversion from said second voltage extreme to said first extreme, a voltage-responsive variable phase shifting device for synchronizing said alternating output voltage wave with a reference voltage source, and phase comparator means connected to the output of said saw-tooth voltage generator and adapted to be periodically rendered operative by recurrent voltage pulses applied thereto for applying to said phase shifting device a voltage varying abruptly in accordance with a small relative phase shift of said recurrent pulses with respect to said saw-tooth alternating voltage cycles for retaining said rapid reversion portion of each successive alternating voltage cycle synchronized with said recurrent pulses.

9. Apparatus as defined in claim 8, wherein said impedance means connected in series with said anode-cathode circuit includes filter means for integrating the voltage drop produced across said impedance during said recurrent pulses.

10. Phase sensitive apparatus for maintaining a desired phase relation between a generated alternating voltage and recurrent pulses harmonically related with a reference signal, comprising saw-tooth voltage generator means synchronized with said reference signal for producing a periodic output voltage varying unidirectionally throughout a large part of each cycle and in the opposite direction during a relatively small part of each cycle, means for shifting the phase of said periodic output voltage with respect to said reference signal, and means responsive to deviations from synchronization of said recurrent pulses and said relatively small parts of said periodic output voltage cycles for controlling said phase shifting means to restore said synchronizations.

11. Phase sensitive apparatus comprising a saw-tooth voltage wave source, a source of recurrent pulses harmonically related with a reference signal, and voltage-responsive phase-shifting means coupled to said first source and said second source and responsive to the voltage of said voltage wave during said pulses for maintaining the phase of said saw-tooth voltage wave with respect to said reference signal substantially equal to the phase of said recurrent pulses with respect to said reference signal.

12. Phase sensitive apparatus for maintaining a desired phase relation between a first periodic voltage wave having a saw-tooth waveform and a second periodic voltage wave comprising recurrent pulses, comprising means for producing a voltage substantially proportional to the value of said first voltage wave during predetermined portions of the successive cycles of said second voltage wave, and means responsive to variations of said produced voltage for varying the relative phase of said first and second periodic voltage waves in a manner to suppress said variations.

ROBERT F. MOZLEY.
MARY P. PENSYL,
Executrix of the Estate of Daniel S. Pensyl, Deceased.

REFERENCES CITED

The following references are of record in the file of this patent:

UNITED STATES PATENTS

| Number | Name | Date |
|---|---|---|
| 2,250,708 | Herz | July 29, 1941 |
| 2,256,482 | Isbister et al. | Sept. 23, 1941 |
| 2,323,762 | George | July 6, 1943 |
| 2,356,187 | Swedlow | Aug. 22, 1944 |